United States Patent [19]

Levy et al.

[11] Patent Number: 4,833,602
[45] Date of Patent: May 23, 1989

[54] SIGNAL GENERATOR USING MODULO MEANS

[75] Inventors: Jack R. Levy, Essex Junction; Sebastian T. Ventrone, South Burlington, both of Vt.

[73] Assignee: International Business Machines Corporation, Armonk, N.Y.

[21] Appl. No.: 67,580

[22] Filed: Jun. 29, 1987

[51] Int. Cl.[4] .................. G06F 12/06; G06F 12/00
[52] U.S. Cl. .................................. 364/900; 364/960; 364/960.6
[58] Field of Search ............... 364/746, 200 MS File, 364/900 MS File

[56] References Cited

U.S. PATENT DOCUMENTS

| | | | |
|---|---|---|---|
| 3,980,874 | 9/1976 | Vora | 235/175 |
| 4,202,035 | 5/1980 | Lane | 364/200 |
| 4,569,016 | 2/1986 | Hao et al. | 364/200 |
| 4,742,479 | 5/1988 | Kloker et al. | 364/746 |

OTHER PUBLICATIONS

IBM Technical Disclosure Bulletin, "Circular Addressing Circuitry for Accessing Computer Storage" by G. H. Hatfield, A. Peled, R. H. Riekert, vol. 20, No. 2, Jul. 1977, pp. 871-872.

Primary Examiner—Gareth D. Shaw
Assistant Examiner—Michael A. Jaffe
Attorney, Agent, or Firm—Stephen J. Limanek

[57] ABSTRACT

A signal generator provides circular addressing, i.e., performs basic modulo boundary indexing, which includes both positive and negative addressing, by adding an increment to a base register until a modulo boundary is reached without permitting the carry bit to propagate but instead resetting the address back to its lowest value. More particularly, the invention provides a signal generator which includes an adder having base address signals applied thereto from one of a plurality of registers and having an operand such as signals from an instruction data register (IDR) also applied thereto. Selected most significant bits from the output of the adder are applied to the input of a modulo mask function unit. Also applied to the input of the modulo mask function is a number of most significant bits of the base address signal. The carry bit from the adder is also applied to the input of the modulo mask function unit. The desired modulo is selected under the control of a decoder coupled to the modulo mask function unit. The output from the modulo mask function unit is applied to a common address register, along with the remaining least significant bits from the adder. In a preferred embodiment of the invention, the modulo mask function unit includes a plurality of passgates connected between the adder and the common address register and between the source of the most significant bits of the base address signals and the common address register.

30 Claims, 3 Drawing Sheets

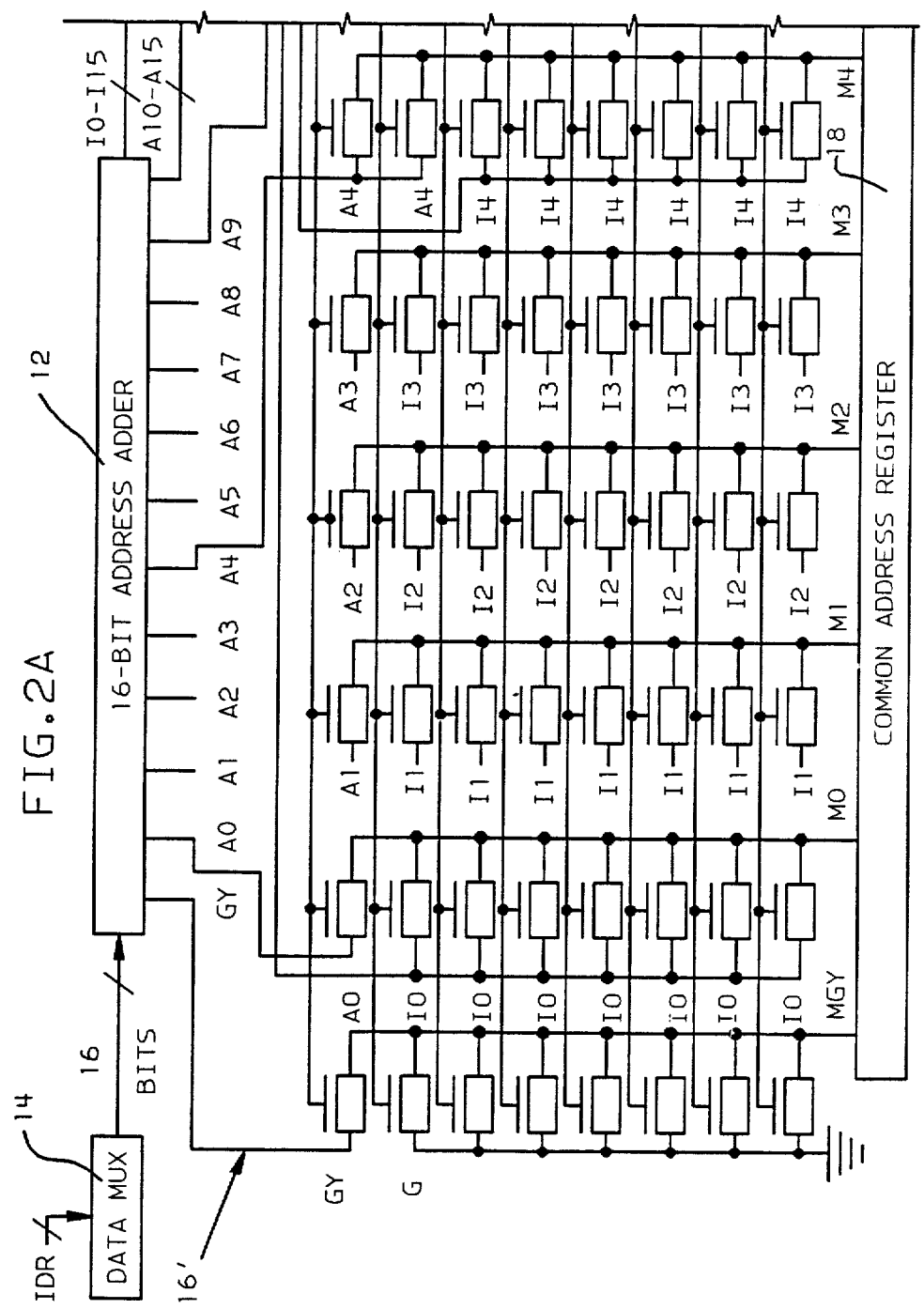

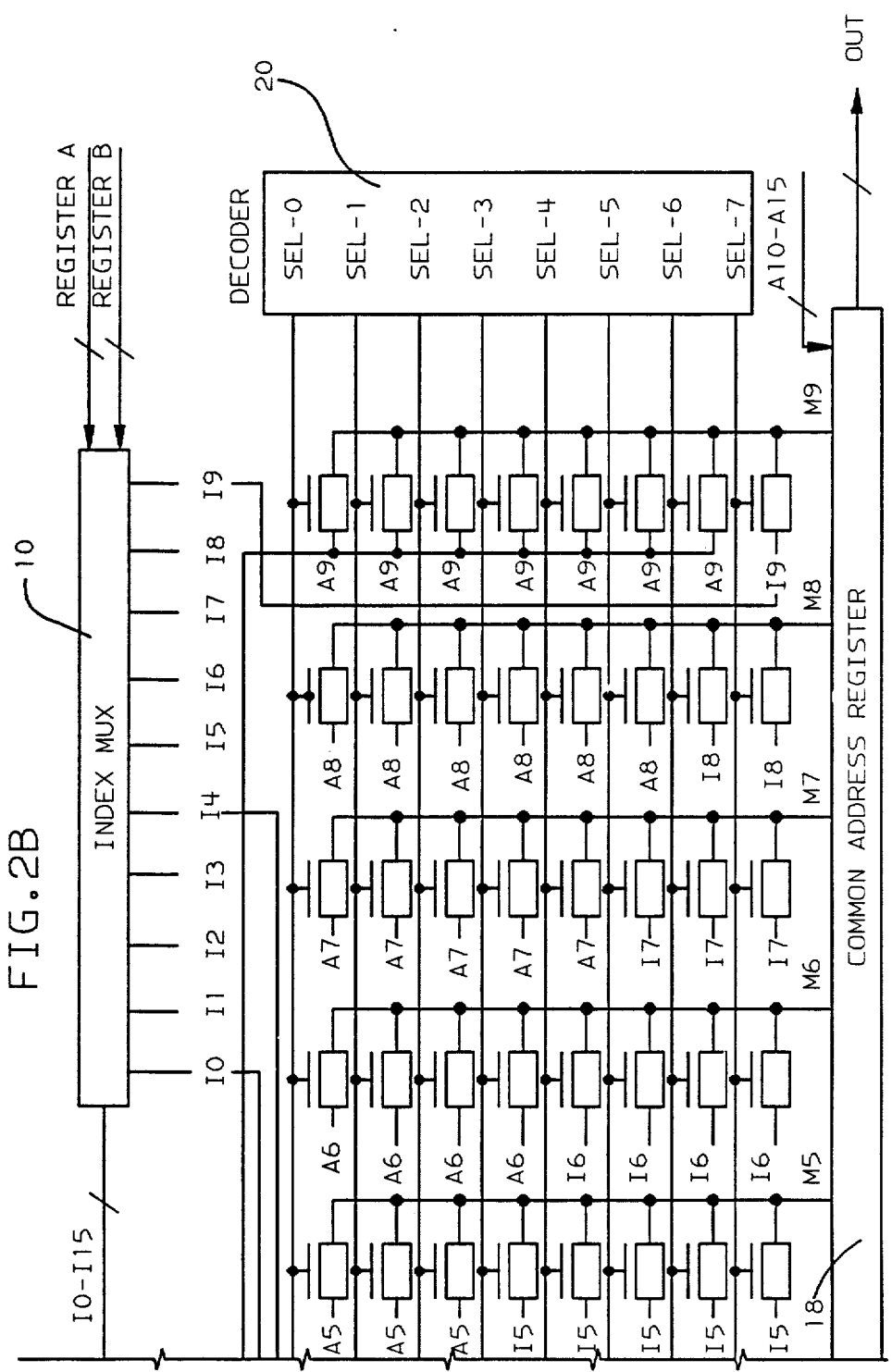

SIGNAL GENERATOR USING MODULO MEANS

TECHNICAL FIELD

This invention relates to data processing and more particularly to a signal, both address and data, generator for providing circular addressing which includes both positive and negative addressing, i.e., the addressing may be incremented or decremented.

BACKGROUND

The prior art contains many general references relating to the handling of addresses and data which disclose circular addressing circuitry or systems.

In U.S. Pat. No. 4,202,035, filed on Nov. 25, 1977, there is disclosed modulo addressing apparatus which includes an adder having its output connected to the input of a modulo addition logic unit with a multiplexer (MUX) also being connected to the inputs of the modulo addition logic unit as well as to the inputs of the adder to provide a random access memory (RAM) address at the output of the modulo addition logic unit.

Circular addressing circuitry is disclosed in an IBM Technical Disclosure Bulletin article, "Circular Addressing Circuitry For Accessing Computer Storage", by G. H. Hatfield, A. Peled and R. H. Riekert, Vol. 20, No. 2 July 1977, pp. 871-872, wherein outputs from an adder and a mask register are fed into a first AND circuit which has its output combined with the output of a second AND circuit to provide an effective address through an OR circuit.

U.S. Pat. No. 3,980,874, filed on May 9, 1975, by C. R. Vora, discloses apparatus for translating to modulo M a binary number of value greater than a number M.

Commonly assigned U.S. Pat. No. 4,569,016, filed on June 30, 1983, by H. T. Hao, P. W. Markstein and G. Radin, discloses a mechanism for performing mask and rotate instructions.

In general, the approach to implementing circular addressing is to suppress the carry in the carry chain of an adder at a predetermined modulo boundary. Two concerns exist with this approach. First, extra stages of delay are added at each modulo boundary area and, second, logically negative modulo addressing cannot be performed.

DISCLOSURE OF THE INVENTION

It is an object of this invention to provide a fast, dense and low-power signal generator for use in memory or logic systems, such as signal processors, performing circular addressing, either incremented or decremented, which includes a modulo mask function.

In accordance with the teachings of this invention, a signal generator provides circular addressing, i.e., performs basic modulo boundary indexing, by adding an increment to a base register until a modulo boundary is reached without permitting the carry bit to propagate but instead resetting the address back to its lowest value. More particularly, the invention provides a signal generator which includes an adder having base address signals applied thereto from one of a plurality of registers and having an operand such as signals from an instruction data register (IDR) also applied thereto. Selected most significant bits from the output of the adder are applied to the input of a modulo mask function unit. Also applied to the input of the modulo mask function is a like number of significant bits of the base address signal. The carry bit from the adder is also applied to the input of the modulo mask function unit. The desired modulo is selected under the control of control means such as a decoder coupled to the modulo mask function unit. The output from the modulo mask function unit is applied to signal receiving means, such as a common address register, along with the remaining least significant bits from the adder. In a preferred embodiment of the invention, the modulo mask function unit includes a plurality of passgates connected between the adder and the common address register and between the source of the most significant bits of the base address signals and the common address register.

The foregoing and other objects, features and advantages of the invention will be apparent from the following more particular description of the preferred embodiments of the invention, as illustrated in the accompanying drawings.

BEST MODE FOR CARRYING OUT THE INVENTION

Figure 1:
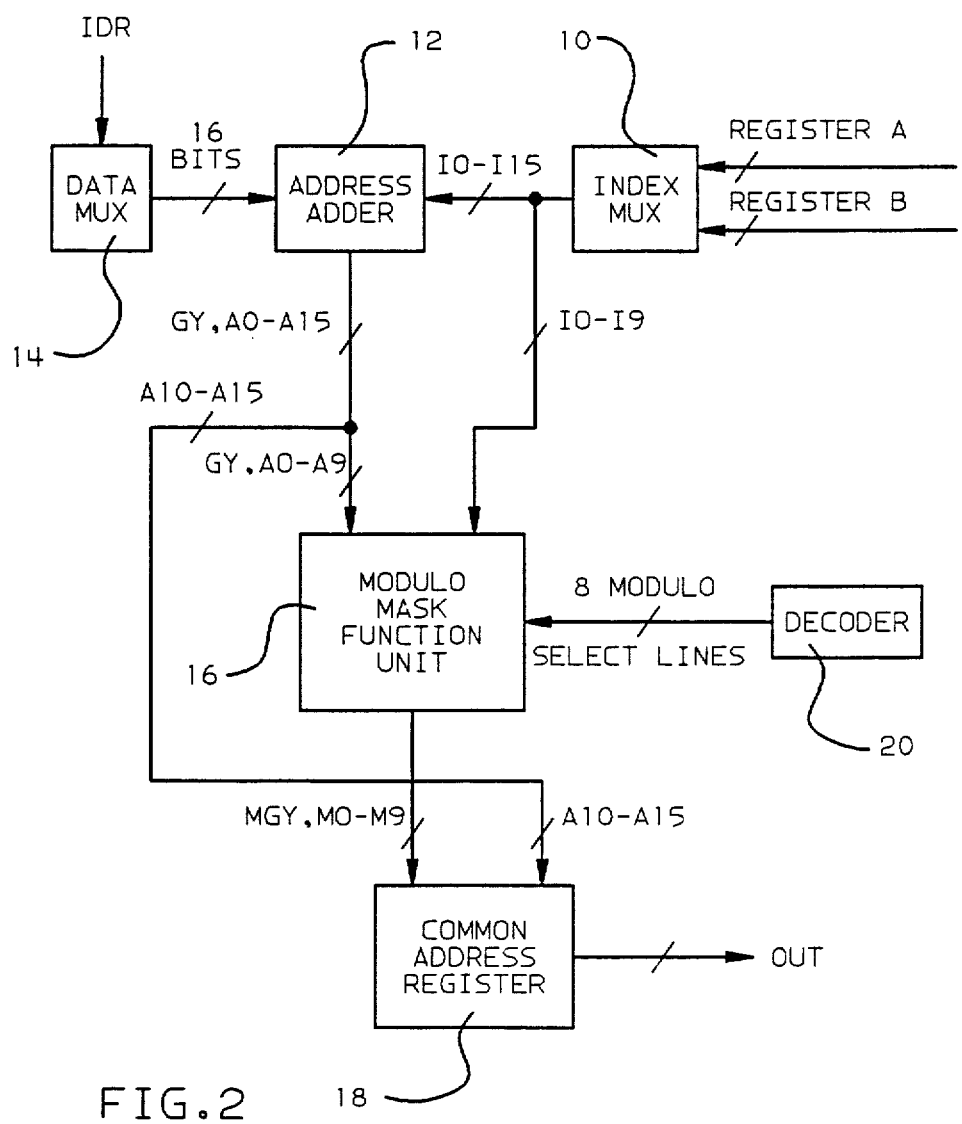
FIG. 1 illustrates in block form an embodiment of the signal generator of the present invention, FIG. 2 indicates the relationship of FIGS. 2A and 2B, and FIGS. 2A and 2B combined are a somewhat detailed diagram of the signal generator illustrated in FIG. 1.

Referring to the drawings in more detail, there is illustrated in block form in FIG. 1 an embodiment of the signal generator of the present invention. The signal generator includes an index multiplexer (MUX) or any known base address means 10 having inputs for receiving, simultaneously, a plurality of signals, e.g., 16, in the form of binary digits or bits from a first register A and for receiving, simultaneously, a plurality of signals, e.g., 16, in the form of binary digits or bits from a second register B. A 16 bit address adder or any known adder means 12 has inputs for receiving 16 bits, I0–I15, with I0 being the most significant bit and I15 being the least significant bit, from the output of the index MUX 10 and for receiving 16 bits from a data formatter or multiplexer MUX or any known operand means 14 into which are fed signals from an instruction data register (IDR). At the output of the adder 12 are provided 16 bits, A0–A15, with A0 being the most significant bit and A15 being the least significant bit, and a carry bit GY. The carry bit GY and the ten most significant bits A0–A9 are applied to the input of a modulo mask function unit or modulo means 16, with the remaining bits, the least significant bits A10–A15, from the output of the adder 12 being applied directly to the input of a common address register or other signal receiving means 18. Also, applied to the input of the modulo mask function unit 16 are the most significant bits I0–I9 from the index MUX 10. A decoder or any known controller means 20 having eight modulo select lines is coupled to control elements or electrodes of the modulo mask function unit 16. The signals or bits MGY, M0–M9 from the output of the modulo mask function unit 16 are applied to the input of the common address register 18, with the bits M0–M9 being the most significant bits and the bits A10–A15 being the least significant bits, and bit MGY being the carry bit. Signals or bits from the output OUT of the common address register 18 may be supplied in a serial or parallel manner, as is known.

In the operation of the signal generator of the present inventions as illustrated in FIG. 1 of the drawings, signals provided in the instruction data register IDR, by means not shown, select the bits I0–I15 of either register A or register B which are to pass through the index MUX 10 to the input of the adder 12, with the most significant bits I0–I9 also being applied to the input of the modulo mask function unit 16. Sixteen signals or bits from the instruction data register IDR, after passing through the data formatter or MUX 14 of any conventional type, are also applied to the input of the address adder 12. After the sixteen bits from the data formatter or MUX 14 are added in address adder 12 to the bits I0–I15, there is provided at the output of the adder 12 the sum bits A0–A15, along with the carry GY. The least significant bits A10–A15 are applied directly to the input of the common address register 18 while the carry GY and the most significant bits A0–A9 are applied to the input of the modulo mask function unit 16. Depending upon the modulo boundary desired, e.g., 32, 64, 128, 256, 512, 1024, or 2048 halfword boundary, the decoder 20 selects the appropriate select line so as to pass from the modulo mask function unit 16 to the common address register 18 the correct combination of high order bits, e.g., bits A8 and A9 from the adder 12 and bits I0–I7 from the index MUX 10, with the carry bit GY being suppressed, for a 128 halfword boundary. It can be seen that the six least significant bits A10–A15 from the adder bypass the modulo mask function unit 16 and, therefore, remain unhindered, i.e., they are always applied to the common address register 18 as the six least significant bits. Accordingly, it should be noted that if the 16 bits from the instruction data register IDR are supplied as instructions to, say, increment the signals or bits I0–I15 by +2, a circular address is provided since only the six least significant bits I10–I15 from the index MUX 10 are incremented by 2 in the adder 12, resulting in signals A10–A15, along with the bits I8 and I9, which become the sum digits or bits A8 and A9 from the output of the adder 12. The six least significant signals or bits A10–A15 are applied directly to the common address register 18, while the bits A8 and A9 from the output of the adder 12 are applied to the common address register 18 through the modulo mask function unit 16 as bits M8 and M9. The most significant bits I0–I7 pass through the modulo mask function 16 as a result of the boundary selection by the decoder 20 to be applied to the common address register 18 as bits M0–M7. Since, in this situation, bits I0–I7 always pass through the modulo mask function unit 16 to the common address register 18 as most significant bits M0–M7, the circular address is set at the 128 halfword boundary, i.e., only the least significant bits M8, M9 and A10–A15 are incremented. It can be seen that by using 2's complement techniques in the instruction data register IDR, the signals or bits I0–I15 from the index MUX 10 can be incremented by −2 or, i.e., decremented by 2.

Although in the hereinabove described example the decoder 20 selected the 128 halfword boundary, it should be understood that if a 32 halfword boundary is desired, all of the bits I0–I9 from the index MUX 10 pass through the modulo mask function 16 under the control of the decoder 20 to the input of the common address register 18 as bits M0–M9, i.e., only the least significant bits I10–I15 are incremented by +2 to provide the resulting bits A10–A15 at the output of the adder 12 which are applied directly to the input of the common address adder 18. If no boundary is required, the decoder 20 can select a line which passes all signals or bits A0–A9, along with the carry bit GY, through the modulo mask function unit 16 to the input of the common address register 18 as bits MGY, M0–M9, with the least significant bits A10 and A15 from the adder 10 being applied directly to the input of register 18. It should be understood that the signal generator of this invention may be used to generate desired address signals or bits for, e.g., a memory system, or data signals or bits for a logic system such as a signal processor.

Figure 2:
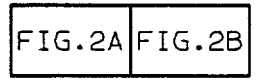

FIG. 2 is a block diagram indicating the interrelationship of FIGS. 2A and 2B of the drawings.

In the combined drawings of FIGS. 2A and 2B there is illustrated a more specific or detailed diagram of the signal generator of the present invention shown in FIG. 1. Elements of the signal generator illustrated in FIGS. 2A and 2B which are similar to the elements of the signal generator shown in FIG. 1 have common or like reference numerals or characters. The diagram of FIGS. 2A and 2B differs significantly from that of FIG. 1 in that a passgate circuit 16' is indicated as the specific circuit of the modulo mask function unit 16 of FIG. 1.

Shown in FIGS. 2A and 2B of the drawings are the index MUX 10, the address adder 12, the data formatter or MUX 14 and the common address register 18 in a similar arrangement to that shown in FIG. 1. However, in FIGS. 2A and 2B individual signal or bit lines for signals or bits GY, A0–A9 are shown at the output of the address adder 12 and individual signal or bit lines I0–I9 for signals or bits I0–I9 are shown at the output of the index MUX 10. Also, the decoder 20 illustrates eight select lines SEI 0 to SEL 7. The passgate circuit 16' includes an array of field effect transistors, e.g., of the N channel type, arranged in eight rows, which may be identified as rows SEL 0 to SEL 7, and eleven columns, which may be identified as columns MGY and M0 to M9, corresponding to the inputs of the common address register 18 to which they are respectively connected. The sources of each of the transistors of a column of transistors are connected to a common one of the inputs MGY, M0–M9 of the common address register 18. For example, the sources of all transistors in the first or left-most column are connected to input MGY and the sources of all of the transistors in the last or right-most column are connected to input M9 of the common address register 18. The control electrodes of each of the transistors of a row of transistors are connected to a common one of the select lines SEL 0 to SEL 7 of the decoder 20. For example, the control electrodes of all transistors of the top or uppermost row of transistors are connected to select line SEL 0 and the control electrodes of all transistors of the bottom or lower-most row of transistors are connected to select line SEL 7.

The carry line GY from the address adder 12 is connected to the drain of the transistor located in the top or SEL 0 row at the left-most or MGY column of the array of transistors in the passgate circuit 16'. Each of the other transistors in the first column has its drain connected to a point of reference potential, such as ground G. As indicated in FIGS. 2A and 2B, the bit lines A0–A9 are connected to the drains of the remaining transistors in the top or SEL 0 row at columns M0–M9, respectively. As can be seen in FIGS. 2A and 2B, in the second column M0 of transistors, the top transistor, i.e., the transistor in row SEL 0, has its drain connected to the bit line A0 from the output of the address adder 12 and each of the other transistors of column M0 has its drain connected to the bit line I0 from the output of the index MUX 10. The transistors in the third, fourth, and fifth columns M1, M2, and M3, are connected in a similar manner as are those in the second column M0 except that the drains of the transistors in columns M1, M2, and M3 in the top row SEL 0 are connected to the bit lines A1, A2, and A3, respectively, of the address adder 12 and the drains of the remaining transistors in columns M1, M2, and M3 are connected to bit line I1, I2, and I3, respectively, of the index MUX 10, as indicated in FIGS. 2A and 2B of the drawings. In the sixth column M4, the drains of the top two transistors, i.e., the transistors in rows SEL 0 and SEL 1, are connected to adder bit line A4 and the drains of the remaining transistors of column M4 are connected to the index MUX bit line I4. In the seventh column M5, the drains of the top three transistors, i.e., the transistors in rows SEL 0, SEL 1, and SEL 2, are connected to adder bit line A5 and the drains of the remaining transistors of column M5 are connected to the index MUX bit line I5. In the eighth column M6, the drains of the top four transistors, i.e., the transistors in rows SEL 0, SEL 1, SEL 2, and SEL 3, are connected to adder bit line A6 and the drains of the remaining transistors of column M6 are connected to the index MUX bit line I6. In the ninth column M7, the drains of the lower three transistors, i.e., the transistors in rows SEL 5, SEL 6, and SEL 7, are connected to the index MUX bit line I7 and the drains of the remaining transistors of column M7 are connected to the adder bit line A7. In the tenth column M8, the drains of the lower two transistors, i.e., the transistors in rows SEL 6 and SEL 7, are connected to the index MUX bit line I8 and the drains of the remaining transistors of column M8 are connected to the adder line A8. In the last or eleventh column M9, the drain of the lowest or bottom transistor, i.e., the transistor in row SEL 7, is connected to the index MUX bit line I9 and the drains of the remaining transistors of column M9 are connected to the adder bit line A9.

It can be seen that in the operation of the signal generator illustrated in FIGS. 2A and 2B, when a positive signal or pulse is applied to the line SEL 0 of the decoder 20, all transistors in the first or top row of the passgate 16' are turned on to connect the outputs GY, A0–A9 of the address adder 12 to the inputs MGY, M0–M9, respectively, of the common address register 18. Since the bit lines A10–A15 of the address adder, carrying the least significant bits, are directly connected to the common address register 18, the signal generator of this invention in this situation operates in a normal manner, i.e., with no boundary condition. When a pulse is applied to SEL 1, all the transistors in the second row are turned on to connect index MUX bits I0–I3 to the inputs M0–M3, respectively, of the common address register 18 and the adder bits A4–A9 to the inputs M4–M9, respectively, of the common address register 18. When a pulse is applied to SEL 2, all the transistors in the third row are turned on to connect index MUX bits I0–I4 to the inputs M0–M4, respectively, of the register 18 and the adder bits A5–A9 to the inputs M5–M9, respectively, of the register 18. When SEL 3 is selected, all the transistors in the fourth row are turned on to connect index MUX bits I0–I5 to the inputs M0–M5, respectively, of the register 18 and the adder bits A6–A9 to the inputs M6–M9, respectively, of the register 18. When SEL 4 is selected, index MUX bits I0–I6 are applied to the inputs M0–M6, respectively, and the adder bits A7–A9 are applied to the inputs M7–M9, respectively, of the register 18. With SEL 5 selected, index MUX bits I0–I7 are applied to the inputs M0–M7, respectively, and the adder bits A8–A9 are applied to the inputs M8–M9, respectively, of the register 18. With SEL 6 selected, index MUX bits I0–I8 are applied to the inputs M0–M8, respectively, and the adder bit A9 is applied to the input M9 of the register 18. When SEL 7 turns on, all index MUX bits I0–I9 pass through the passgate 16' to the inputs M0–M9, respectively, of the register 18. It should be noted that the carry bit GY from the adder 12 passes through the passgate 16' to the input MGY of the register 18 only when the signal generator is operating in a normal manner, i.e., without a boundary condition being set up for circular addressing.

Referring back to the selection by decoder 20 of SEL 7, it can be seen that if a 16 bit word I0–I15 is applied from, say, register A through the index MUX 10 to the address adder 12 and the instruction data register bits passing through the data formatter or MUX 14 to the adder 12 direct the adder to increment the address from register A by +2, the addition function will be carried out only to the extent that addition can be performed in the least significant bit location A10–A15 and applied to the inputs of the common address register 18 as the least significant bits in register 18, the other inputs M0–M9 of the register 18 will be the more significant bits I0–I9 of the index MUX 10 passing through passgate 16' to the inputs M0–M9 of the register 18. The 16 bit word M0–M9 and A10–A15 in register 18 may then be applied to the register A from which in a next cycle it is introduced into the adder 12 along with the increment by +2 instruction from the IDR to repeat the incrementing function. It can be seen that this process can continue indefinitely but at no time will the addition exceed the boundary selected by SEL 7 since the inputs M0–M9 will always be the same as the outputs I0–I9 from the index MUX 10. Thus, a circular address will result within the adder bits A10–A15. If a higher boundary is desired for the circular address, it can be seen that SEL 6 of the decoder should be selected to provide seven least significant bits, i.e., A9, as well as A10–A15, with the index MUX 10 providing bits I0–I8 to the register 18 at inputs M0–M8, respectively. If still higher boundaries are desired for circular addressing, SEL 5 to SEL 1 may be chosen.

To more clearly understand the relationship of the bits from the index MUX 10 and the adder 12 passing through the passgate 16', reference may be had to the following Table I:

TABLE I

| DECODER | BOUNDARY | INDEX MUX BITS I | ADDER BITS A | |
|---------|----------|------------------|--------------|---|
| SEL 0 | No Boundary | None | GY,0,1,2,3,4,5,6,7,8,9 | A10-A15 |
| SEL 1 | 2048 | 0,1,2,3 | 4,5,6,7,8,9 | A10-A15 |
| SEL 2 | 1024 | 0,1,2,3,4 | 5,6,7,8,9 | A10-A15 |
| SEL 3 | 512 | 0,1,2,3,4,5 | 6,7,8,9 | A10-A15 |
| SEL 4 | 256 | 0,1,2,3,4,5,6 | 7,8,9 | A10-A15 |
| SEL 5 | 128 | 0,1,2,3,4,5,6,7 | 8,9 | A10-A15 |
| SEL 6 | 64 | 0,1,2,3,4,5,6,7,8 | 9 | A10-A15 |

TABLE I-continued

| DECODER | BOUNDARY | INDEX MUX BITS I | ADDER BITS A |
|---------|----------|------------------|--------------|
| SEL 7   | 32       | 0,1,2,3,4,5,6,7,8,9 | A10-A15   |

Thus, it can be seen that when SEL 7 of the decoder is selected, a boundary 32 is established with bits I0–I9 from the index MUX passing through the passgate or modulo mask function unit 16' and with none of the bits A0–A9 from the adder 12 passing through the passgate 16', but with the adder 12 supplying only the output bits A10–A15 which are applied directly to the common address register 18. Likewise it can be seen that for a boundary 256, SEL 4 of the decoder is selected and bits I0–I6 of the index MUX 10 and the bits A7–A9 pass through the passgate 16' to the register 18, with adder bits A10–A15 being applied directly to register 18. If SEL 0 of the decoder 20 is selected, bits A0–A9, along with the carry bit GY, from the adder 12 pass through the passgate 16' so as to apply to the common address register 18 the entire word or output GY, A0–A15 from the adder 12.

Viewing the signal generator of the present invention from the inputs to the common address register 18, the following Table II indicates which of the signals I0–I9 from the index MUX 10 and which of the signals A0–A9 are applied to the inputs M0–M9 upon selection of a particular output, SEL 0 to SEL 7, from the decoder 20.

It should be noted in Example I that when register A provides an address 63 to the adder 12 in binary form and the instruction data register IDR instructs the adder 12 to increment by +2 for a modulo boundary condition of 32, the six least significant bits A10–A15 at the output of the adder 12 become 00 0001. Upon subsequent request to increment by +2, the least significant bits at the output of the adder 12 will eventually become 11 1111. Thereafter, the upon again incrementing by +2, the output from the adder 12 for the least significant bits A10–A15 will revert to 00 0001 since the more significant bits A0–A9 will in each instance pass through the passgate 16' to the common address register 18. Thus, circular addressing is provided. It can be seen that with the conventional carry break technique, a 1 propagates into the A9 location at the output of the adder 12 unless some additional logic circuitry is provided for the adder 12 to suppress this 1 bit. Although 0's are shown in the register A for bits I0–I9, it should be understood that any desired binary digit may be provided in the locations I0–I9 in the operation of this invention In Example II, the register A has provided an address 127 in binary form and the instruction from IDR is to

TABLE II

| DECODER | BOUNDARY | INPUT TO COMMON ADDRESS REGISTER, 18 | | | | | | | | | | |
|---------|----------|-----|-----|-----|-----|-----|-----|-----|-----|-----|-----|---------|
|         |          | MGY | M0  | M1  | M2  | M3  | M4  | M5  | M6  | M7  | M8  | M9  | A10-A15 |
| SEL 0   | No Boundary | GY, | A0, | A1, | A2, | A3, | A4, | A5, | A6, | A7, | A8, | A9 | A10-A15 |
| SEL 1   | 2048     | G,  | I0, | I1, | I2, | I3, | A4, | A5, | A6, | A7, | A8, | A9 | A10-A15 |
| SEL 2   | 1024     | G,  | I0, | I1, | I2, | I3, | I4, | A5, | A6, | A7, | A8, | A9 | A10-A15 |
| SEL 3   | 512      | G,  | I0, | I1, | I2, | I3, | I4, | I5, | A6, | A7, | A8, | A9 | A10-A15 |
| SEL 4   | 256      | G,  | I0, | I1, | I2, | I3, | I4, | I5, | I6, | A7, | A8, | A9 | A10-A15 |
| SEL 5   | 128      | G,  | I0, | I1, | I2, | I3, | I4, | I5, | I6, | I7, | A8, | A9 | A10-A15 |
| SEL 6   | 64       | G,  | I0, | I1, | I2, | I3, | I4, | I5, | I6, | I7, | I8, | A9 | A10-A15 |
| SEL 7   | 32       | G,  | I0, | I1, | I2, | I3, | I4, | I5, | I6, | I7, | I8, | I9 | A10-A15 |

To even more clearly understand the operation of the signal generator of the present invention, reference may be had to the following examples:

|  | Carry Break | Modulo Masking |
|---|---|---|
| Example I: | | |
| Register A = 63 | 0000 0000 00/11 1111 | 0000 0000 00/11 1111 |
| IDR | 0000 0000 00/00 0010 | 0000 0000 00/00 0010 |
| Increment by +2: | 0000 0000 01/00 0001 | 0000 0000 00/00 0001 |
| Example II: | | |
| Register A = 127 | 0000 0000 01/11 1111 | 0000 0000 01/11 1111 |
| IDR | 0000 0000 01/00 0010 | 0000 0000 01/00 0010 |
| Increment by +66: | 0000 0000 11/00 0001 | 0000 0000 01/00 0001 |
| Example III: | | |
| Register A = 65 | 0000 0000 01/00 0001 | 0000 0000 01/00 0001 |
| IDR | 1111 1111 11/11 1110 | 1111 1111 11/11 1110 |
| Increment by −2: | 10000 0000 00/11 1111 | 0000 0000 01/11 1111 |

In the above examples the slash line (/) indicates the modulo halfword boundary which in this instance is at 32.

increment by +66, which is a greater number than the modulo boundary 32. It can be seen that again only the least significant bits A10–A15 are involved in the addition process with the bits I0–I9 passing to the inputs M0–M9 of the register 18 to again provide circular addressing. In the carry break portion of Example II, the carry was allowed to propagate to effectively location A8, and, therefore, circular addressing wa not performed.

Although the two examples discussed hereinabove involve incrementing by positive numbers, it should be understood that incrementing in accordance with the teachings of this invention can be accomplished by using negative numbers as indicated in Example III. To decrement or increment by −2, as indicated in Example III, the −2 is converted, as is known, to 2's complement designation and then added in the adder 12 in the conventional manner. It can be seen in Example III that the conventional carry break technique is incapable of decrementing or incrementing by a negative number since the 1 propagates onto a carry, whereas in the modulo masking technique of the present invention the circular address is confined to adder 12 or register 18 bits A10–A15.

It should be noted that the selection of the modulo boundary can be provided by appropriate data bits in the instruction data register IDR which are supplied to the decoder 20 for selection of one of the lines SEL 0 to SEL 7, or decoder 20 can be controlled by any known main control register.

In a preferred embodiment of this invention, the least significant bit, I15, from the index MUX 10, may be used to activate the decoder 20 such that if this bit is a 1, the decoder 20 is activated but if it is a 0, decoder 20 becomes inactive.

Although, as a preferred embodiment of this invention, the modulo mask function unit 16 of FIG. 1 has been illustrated in FIGS. 2A and 2B as a passgate 16', it should be understood that other embodiments fall within the scope of this invention. For example, logic macros such as AND-OR-INVERT circuits can be used which have the adder 12, index MUX 10, and decoder 20 outputs appropriately applied thereto for passing the desired bits GY, A0-A9 and I0-I9 to the inputs of the common address register 18. Since address generation circuits have been critical paths in logic circuitry which limit the performance of logic systems, the signal generator with the passgate 16' providing a delay of no more than 2 nanoseconds through the modulo mask function unit is preferred. The passgate 16' of the signal generator is also very desirable from a density standpoint in forming integrated semiconductor circuits. Another advantage of the use of the passgate 16' as the modulo mask function unit of the signal generator is that it does not use DC power since depletion devices are not required.

Accordingly, it can be seen that an improved signal generator, for use in memory or logic systems, has been provided employing circular addressing with positive or negative incrementing which has high density, minimum gate count, least delay and no DC power dissipation, and which does not require carry break circuits. Although eight modulo configurations of the signal generator have been illustrated, it should be understood that boundaries from 0 to any desired number, such as 64,000 or even higher, can be provided by the generator of the present invention since this generator can be used in 16 bit, 32 bit or higher logic systems, if desired. The invention has been illustrated as a 16 bit or halfword system because of the popularity of such systems in the industry, however, a 32 bit or full word system can use similar modulo mask function macros or circuitry for providing both positive and negative incrementing in accordance with the teachings of this invention. Furthermore, although the specific circuit of the modulo mask function unit 16' of FIGS. 2A and 2B has been illustrated as a circuit having transistors of N channel type, it should be understood that the invention is independent of technology, e.g., complementary metal oxide semiconductor (CMOS) technology may be used.

While the invention has been particularly shown and described with reference to preferred embodiments thereof, it will be understood by those skilled in the art that various changes in form and details may be made therein without departing from the spirit and scope of the invention.

What is claimed is:

1. A signal generator comprising
adder means having first and second inputs and an output having a plurality of binary bits extending from least significant to most significant bits,
base address means having a plurality of binary bits extending from least significant to most significant bits coupled to said first input of said adder,
operand means coupled to said second input of said adder means,
modulo means having first and second inputs, an output and control means, said most significant bits of said adder means being applied to the first input of said modulo means and said most significant bits of said base address means being applied to the second input of said modulo means,
controller means coupled to the control means of said modulo means, and
signal receiving means having first and second inputs and an output, said least significant bits of said adder means being applied to the first input of said signal receiving means and the output of said modulo means being coupled to the second input of said signal receiving means.

2. A signal generator as set forth in claim wherein a given number of most significant bits of said adder means and said given number of most significant bits of said base address means are applied to said first and second inputs, respectively, of said modulo means.

3. A signal generator as set forth in claim 2 wherein the output of said adder means further includes a carry bit and said carry bit is applied to the first input of said modulo means.

4. A signal generator as set forth in claim 1 wherein said adder means is an address adder and said controller means is a decoder.

5. A signal generator as set forth in claim 1 wherein said signal receiving means is an address register.

6. A signal generator as set forth in claim 1 wherein said modulo means is a modulo mask function unit.

7. A signal generator as set forth in claim 6 wherein said modulo mask function unit includes control means having transistors controlled by said controller means.

8. A signal generator as set forth in claim 7 wherein said transistors are arranged as passgates disposed between said signal receiving means and the first and second inputs of said modulo mask function unit.

9. A signal generator as set forth in claim 8 wherein said controller means includes a plurality of selection lines connected to control elements of said transistors.

10. A signal generator as set forth in claim 9 wherein said transistors are arranged in columns and rows.

11. A signal generator as set forth in claim 10 wherein the output of said adder means further includes a carry bit applied to one terminal of one of said transistors of said modulo mask function unit, said one transistor having a control element connected to one of said plurality of selection lines.

12. A signal generator comprising
adder means having first and second inputs and an output having a plurality of binary bits extending from least significant to most significant bits,
base address means having a plurality of binary bits extending from least significant to most significant bits coupled to said first input of said adder,
operand means coupled to said second input of said adder means
modulo means having first and second inputs, an output and control means, said most significant bits of said adder means being applied to the first input of said modulo means and said most significant bits of said base address means being applied to the second input of said modulo means,
signal receiving means having first and second inputs and an output, said least significant bits of said adder means being applied to the first input of said signal receiving means, and controller means coupled to the control means of said modulo means for selectively coupling the most significant bits of said adder means and the most significant bits of said base address means to the second input of said signal receiving means.

13. A signal generator as set forth in claim 12 wherein the output of said adder means further includes a carry bit applied to the first input of said modulo means.

14. A signal generator as set forth in claim 12 wherein said modulo means includes a plurality of switches interconnecting said first and second inputs thereof to said output thereof.

15. A signal generator as set forth in claim 14 wherein each of said switches is a transistor having control means coupled to said controller means, said transistors being arranged in columns and rows, at least one of said transistors of each column being connected to receive one bit of said most significant bits of said adder and at least a different one of said transistors of each column being connected to receive one bit of said most significant bits of said base address means.

16. A signal generator as set forth in claim 15 wherein said control means includes control electrodes of said transistors.

17. A signal generator as set forth in claim 16 wherein each of said transistors is a field effect transistor having one current carrying electrode connected to said signal receiving means and its other current carrying electrode connected to receive a predetermined one of said most significant bits.

18. A signal generator as set forth in claim 17 wherein each of said transistors is an N channel transistor, said one current carrying electrode is a source electrode and said other current carrying electrode is a drain electrode.

19. A signal generator as set forth in claim 18 wherein said controller means includes a plurality of select lines, each of said select lines being connected to the control electrode of a respective row of said transistors.

20. A signal generator as set forth in claim 19 wherein said controller means includes a decoder.

21. A signal generator comprising an address adder having a first plurality of inputs, a second plurality of inputs, and a plurality of outputs having a plurality of binary bits extending from least significant to most significant bits, base address means having a plurality of binary bits extending from least significant to most significant bits, means for applying said plurality of bits of said base address means to said first plurality of inputs of said address adder, operand means for supplying a plurality of instructional binary bits, means for applying said plurality of instructional binary bits of said operand means to said second plurality of inputs of said address adder, a modulo mask function unit having a first plurality of inputs, a second plurality of inputs and a plurality of outputs, means for applying the most significant bits of said output of said address adder to said first plurality of inputs of said modulo mask function unit, means for applying the most significant bits of said base address means to said second plurality of inputs of said modulo mask function unit, decoding means for selecting said most significant bits applied to the first and second plurality of inputs of said modulo mask function unit, an address register having a first plurality of inputs, a second plurality of inputs and an output, means for applying the least significant bits of the output of said address adder to said first plurality of inputs of said address register, and means for applying said plurality of outputs of said modulo mask means to said second plurality of inputs of said address register.

22. A signal generator as set forth in claim 21 wherein said modulo mask function unit includes a plurality of transistors disposed between said first and second plurality of inputs thereof and said plurality of outputs thereof.

23. A signal generator as set forth in claim 22 wherein each of said transistors has a first current carrying electrode connected to a different one input of said first and second plurality of inputs of said modulo mask function unit and a second current carrying electrode connected to a different one output of said plurality of outputs of said modulo mask function unit.

24. A signal generator as set forth in claim 13 wherein said decoding means includes a plurality of output lines connected to control electrodes of said transistors.

25. A signal generator as set forth in claim 24 wherein said transistors are arranged in columns and rows and each line of said plurality of lines is connected to the control electrodes of a different row of said transistors.

26. A signal generator as set forth in claim 25 wherein at least one transistor in each column of transistors is connected to one input of said first plurality of inputs of said modulo mask function unit and at least one transistor in each column of transistors is connected to one input of said second plurality of inputs of said modulo mask function unit.

27. A signal generator as set forth in claim 26 wherein each of said transistors is an N-channel field effect transistor.

28. A signal generator as set forth in claim 27 wherein said first and second plurality of inputs of said modulo mask function unit are connected to the drain electrodes of said transistors and the source electrodes of said transistors are connected to said plurality of outputs of said modulo mask function unit.

29. A signal generator as set forth in claim 28 wherein the source electrodes of the transistors of each column of transistors are connected to a different output of said plurality of outputs of said modulo mask function unit.

30. A signal generator as set forth in claim 21 wherein said output of said address adder further has a carry bit and further including means for applying said carry bit to one input of said first plurality of inputs of said modulo mask function unit, said modulo mask function unit further including means for applying said carry bit to one input of said second plurality of inputs of said address register.

* * * * *